Aug. 6, 1940.        R. R. MARRIOTT        2,210,091
FENDER, GRILLE, AND LIGHT PROTECTOR
Filed Sept. 21, 1938
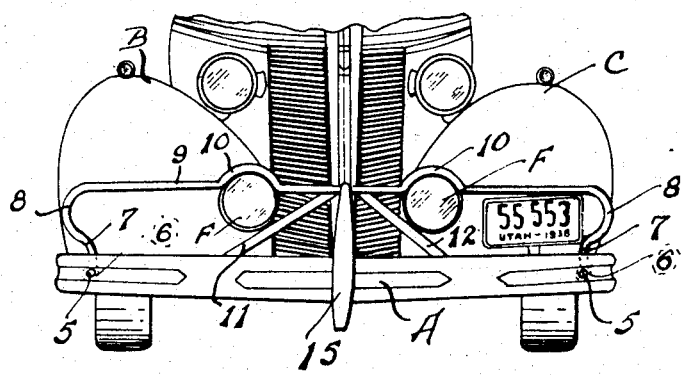
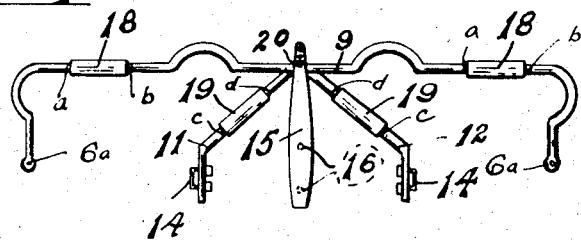
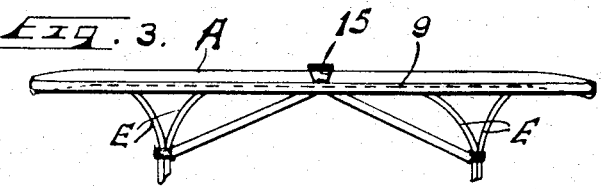
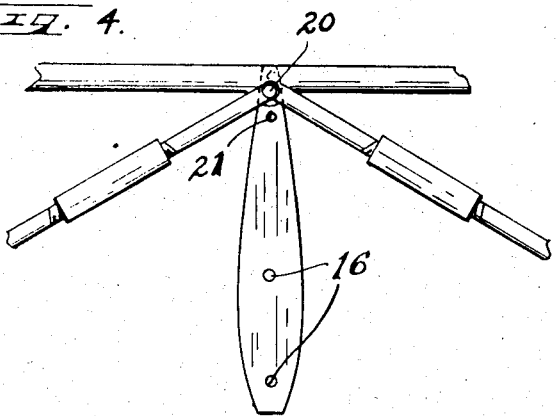
Inventor
Roscoe R. Marriott
By R. M. Thomas
Attorney Patented Aug. 6, 1940

2,210,091

UNITED STATES PATENT OFFICE 2,210,091

FENDER, GRILLE, AND LIGHT PROTECTOR

Roscoe R. Marriott, Bingham Canyon, Utah

Application September 21, 1938, Serial No. 230,901

2 Claims. (Cl. 293—55)

My invention relates to fender, grille and light protectors for automobiles and has for its object to provide a new and highly efficient protector which may be easily and quickly attached to any suitable automobile without any change to the body of the automobile, the bumper or the bumper springs.

A further object is to provide a fender protector which extends from side to side across the front of an automobile from one end to the other of the bumper and which is extended above the bumper level sufficient distance to protect the fenders, and across the front of the automobile and which device is mounted and braced so that it will be solid and safe.

A still further object is to provide a fender, grille and light protector which may be made adjustable as to length to fit any type of automobile and which when fitted to an automobile enhances the appearance thereof and makes it safer to drive with less danger to the pedestrian or the automobile itself.

These objects I accomplish with the device illustrated in the accompanying drawing in which similar numerals and letters of reference indicate like parts throughout the several views and as described in the specification forming a part of this application and pointed out in the appended claims.

In the drawing

Figure 1 is a front view of the elevation of an automobile showing my device attached thereto.

Figure 2 is a front elevation of the device shown made adjustable as to length and removed from the automobile.

Figure 3 is a plan view of the bumper, with my device attached thereto.

Figure 4 is an enlarged view of the central portion of the device showing the manner of mounting the braces when the device is made adjustable.

In the drawing I have shown the automobile bumper as A, with the fenders in Figure 1 shown as B and C. Near each end of the bumper A there are bolts 5 which bolts are employed normally to attach the bumper bar A to the bumper support brackets or springs in Figure 3 as E. These springs normally are curved inwardly toward the frame of the automobile from the end bolts and my device is attached to the ends of the bumper bar by securing the end eyes 6 over the bolts 5.

The eyes 6 are the ends of upwardly extended side arms or legs 7 and the legs 7 are each curved outwardly in a half circular portion 8 which is formed tangentially to the cross bar 9 of the protector. This protector shown as E is provided with raised arc sections 10 spaced medially from the center of the protector bar 9 to permit use of road lights F when desired.

Extending downwardly and rearwardly at an angle from the center of the bar 9 I provide braces 11 and 12 which braces are adapted to be attached to the bumper bar brackets E, each brace having the end turned down parallel to the bracket and having holes therethrough, through which a U-bolt 14 is passed to secure the braces rigidly to the brackets E.

A central rigid rod 15 is secured to the bumper bar A centrally thereof and the top end is secured to the bar 9 by welding or by bolting, making a central vertical rod to aid in protecting the grille. The central rod is preferably secured to the bumper bar by rearwardly extended stud bolts 16 and a cross plate to hold the rod to the bumper bar, by passing the bolts through each end of the plate (not shown).

An adjustable type of device may be made as shown in Figure 2 in which the bar 9 is provided with each end cut in half and the cut ends threaded at $a$ and $b$ and an adjustment sleeve 18 internally threaded to fit the threads of the bar is screwed onto the threaded ends $a$ and $b$ to permit length adjustment.

The brace rods 11 and 12 are also cut and threaded with threads $c$ and $d$ and sleeves 19 are screwed onto the threaded ends to provide for adjustment of these braces.

The top ends of brace rods and the top end of the central bar 15 are perforated to receive a securing bolt 20 which is passed through a depending boss on the bar 9a. Other holes 21 are provided in the central rod to permit vertical adjustment thereof for use on bumpers which have a drop center.

Having thus described my invention I desire to secure by Letters Patent and claim:

1. In a device of the class described the combination of a cross bar having the ends terminating in downwardly extended semi-circular portions with depending legs extending down from the lower end of said portions, having eyes by which the bar is secured to the ends of the bumper bar of an automobile; a central vertical rod extending down from the cross bar to below the lower edge of the bumper bar; means to secure the lower end of said bar to the bumper bar; and diverging rearwardly extended brace rods having their ends turned down and secured to the bumper bar support brackets.

2. A device as set out in claim 1 including means to adjust the length of the cross bar, the brace rods and the vertical rod to fit bars having different widths.

ROSCOE R. MARRIOTT.